United States Patent [19]

Gabriele

[11] Patent Number: 4,518,289
[45] Date of Patent: May 21, 1985

[54] POT BROACH

[75] Inventor: Leonard A. Gabriele, Warren, Mich.

[73] Assignee: Lear Siegler, Inc., Del.

[21] Appl. No.: 568,212

[22] Filed: Jan. 3, 1984

Related U.S. Application Data

[63] Continuation-in-part of Ser. No. 264,859, May 18, 1981, abandoned.

[51] Int. Cl.³ .............................................. B23F 1/08
[52] U.S. Cl. ..................................... 409/244; 409/60; 409/279
[58] Field of Search ...................... 409/244, 6, 59, 60, 409/275, 279, 287

[56] References Cited

U.S. PATENT DOCUMENTS 3,162,089 12/1964 Riggio et al. .......................... 409/59

Primary Examiner—Z. R. Bilinsky
Attorney, Agent, or Firm—Barnes, Kisselle, Raisch, Choate, Whittemore & Hulbert

[57] ABSTRACT

A broaching machine for pot-broaching teeth or ribs on the exterior of a workpiece in which the workpiece is not suitable for having sliding contact with axially extending guide surfaces in the broach to maintain the workpiece centralized therein. The machine comprises a toothed pusher on which a workpiece is centered, the teeth of the pusher registering with the teeth formed in the workpiece by broaching slots therein, at least some of the pusher teeth having end surfaces extending radially beyond the teeth formed by broaching on the workpiece, to maintain the crests of the teeth or ribs on the workpiece in clearance as the workpiece moves through the broach.

3 Claims, 4 Drawing Figures

POT BROACH

CROSS REFERENCE TO RELATED APPLICATIONS

The present invention is a continuation-in-part of my co-pending application Ser. No. 264,859, now abandoned filed May 18, 1981.

BACKGROUND AND SUMMARY OF THE INVENTION

The present invention relates to pot-broaching slots at the circumference of a workpiece, to leave radially outwardly extending teeth or ribs between the slots.

The broach in the machine is generally tubular and is provided at its interior with a multiplicity of rows of cutting teeth, the teeth in each row being of increasing height to cut slots progressively as the workpiece moves relative to the broach longitudinally thereof.

Pot broaching machines may have vertical or horizontal broaches, either the broach or workpiece may be moved relative to the other, and if the workpiece is moved, it may be pushed or pulled through the workpiece. The slots and teeth formed by broaching may be parallel or helically inclined to the axis of the piece. In the illustrated embodiment, a push-up vertical broaching machine is shown, designed to cut slots parallel to the axis of the workpiece and broach.

One of the advantages of broaching is that, properly performed, parts are broached to substantially the accuracy provided for the broach teeth. This assumes of course that the workpiece is accurately guided through the broach. This in turn has been accomplished in the past by providing guide surfaces in the broach which extend parallel to the broach axis, and in using the crests of the teeth or ribs left on the workpiece as the slots are progressively deepened which slide on guide surfaces in the broach which are intermediate adjacent rows of cutting teeth and which extend parallel to the broach axis.

While this has proved perfectly satisfactory in most cases, it sometimes happens that a workpiece is formed of a material or is of a shape which is not suitable to provide the required guiding sliding contact with the broach.

In accordance with the present invention, this difficulty is overcome by providing a pusher having teeth which register with the teeth or ribs of the workpiece as they are formed by broaching slots, the teeth of the pusher having radially outwardly facing crests which slide on axially extending guide surfaces in the broach. The crests of the pusher teeth are located at a diameter slightly larger than the original diameter of the workpiece or the OD of the finished workpiece so that the crests of the teeth or ribs on the workpiece remain.

The pusher is shaped to conform to locating surfaces on the broach so that as the pusher is guided accurately through the broach, so also is the workpiece.

In addition, to insure against circumferential drift as the workpiece moves through the broach, the pusher and broach have cooperating rib and slot guide portions, shown herein as provided by a rib or finger in the pusher received in a guide slot in the broach.

In Riggio et al, U.S. Pat. No. 3,162,089, there is shown a pot broach in which a circular blank is moved through the broach by a toothed forcing head, but the annular die blocks which are assembled to form a pot broach, have central internally toothed openings and which are said to be "-accurately the diameter of the finished gear-its teeth tip diameter." He describes the tips of the forming gear tooth as riding the bores of the blocks to accurately guide and center the blank.

DETAILED DESCRIPTION

The broaching machine disclosed herein is a vertical, push-up pot broaching machine, in which the pot broach 10 is generally in the form of a tubular body having its axis vertical. Only the lower end of the broach is shown, the details of its construction forming no part of the present invention.

The machine comprises means for pushing workpieces vertically upwardly through the pot broach, and this comprises a piston and cylinder device in which the piston rod 14 is connected to pusher assembly which receives and accurately locates a workpiece and pushes it fully through the broach, where it is removed from the pusher before the pusher returns to its lowermost position.

The workpiece W is initially positioned on a locator or guide ring assembly 30,32 directly below the bottom end of the broach 10, said ring assembly comprising part of a stationary frame.

Figure 1:
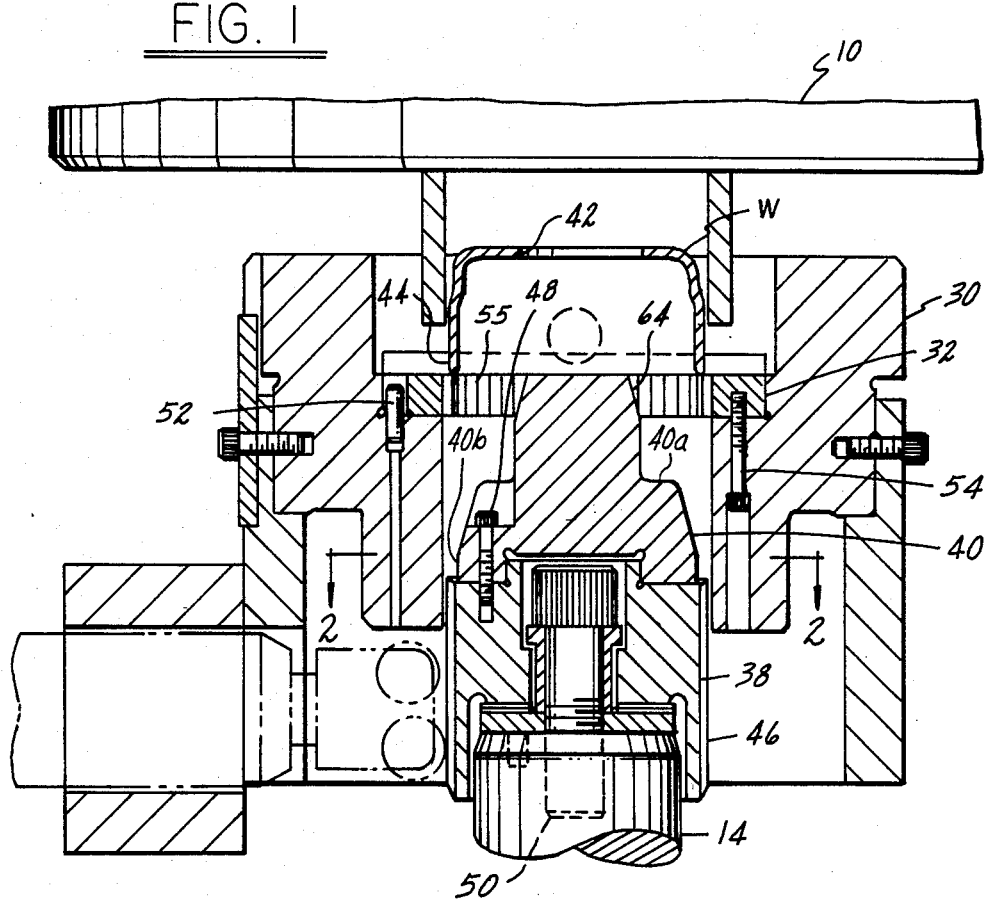
FIG. 1 is a fragmentary vertical section of the broach and pusher.
Figure 2:
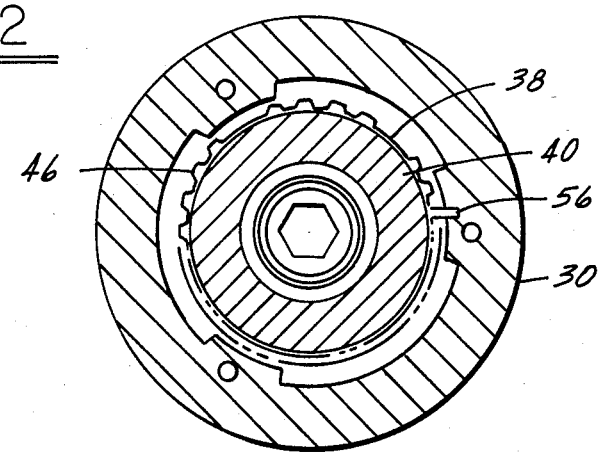
FIG. 2 is a fragmentary section on the line 2—2, FIG. 1.

As best seen in FIG. 1, the piston rod 14 at its upper end carries a work support comprising a lower pusher or guide portion 38 and connected thereto an upper pusher 40. The workpiece illustrated is cup shaped and has a central opening 42 and a rim 44 on which teeth are to be broached. The lower pusher 38 has guide and support teeth 46. The upper and lower pushers 40,38 are bolted together by bolts 48, and the assembled pushers are fastened to rod 14 by socket head screw 50.

Figure 4:
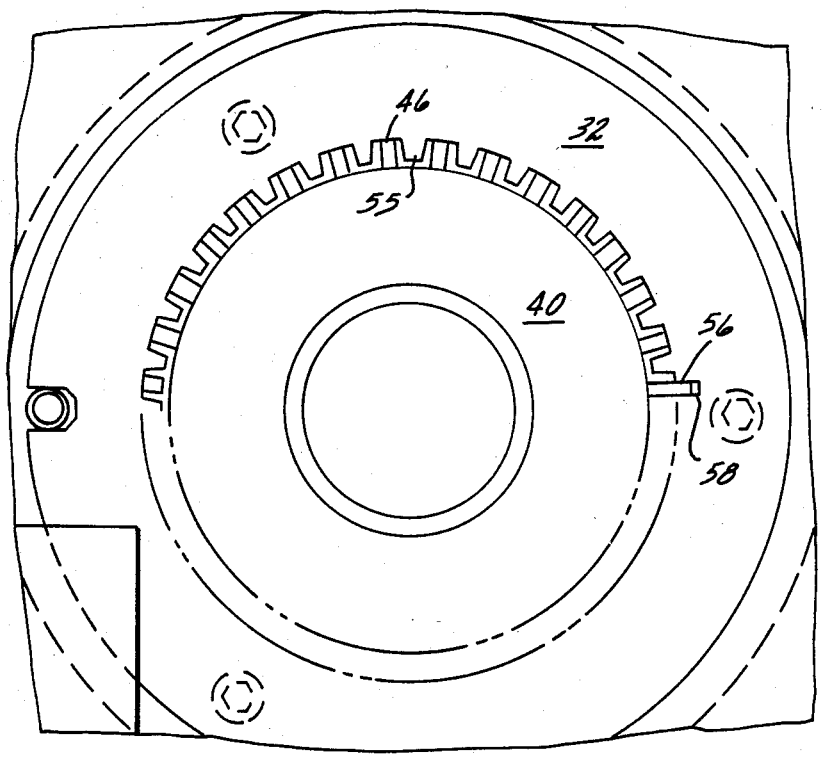
FIG. 4 is an enlarged plan view illustrating the relationship between the pusher and broach teeth.

Rings 30, 32 are secured together by dowel 52 and screws 54. Locating ring 32 has guide teeth 55, best seen in FIG. 4, which receive the teeth 46 on the lower pusher 38 therebetween. The teeth 46 on the pusher 38 pass through spaces between teeth 55 on the stationary ring 32 and through spaces between the rows of longitudinally aligned stepped teeth in the broach.

The teeth 46 on pusher 38 are preferably elongated in the direction parallel to the axis of the broach to maintain contact with the locator ring 32 until the workpiece enters the broach. The upper ends of guide teeth 46 on pusher part 38 are directly adjacent the bottom end of cylindrical surface 40b of pusher portion 40.

In order to maintain circumferential alignment between the pusher and workpiece on the one hand, and the broach, the toothed pusher 38 is provided with at least one radially extending guide key 56 slidably received in elongated guide slot 58 formed in the pot broach. This prevents turning of the part in the broach. Lateral guidance or centering is provided by the crest of pusher teeth 46 and the root surface between adjacent teeth 55 of the guide ring assembly, and the extensions thereof in the pot broach.

Accordingly, the workpieces W are fixedly supported on the work support assembly 38, 40, and pushed through the pot broach in accurately guided relation as determined by coaction between the assembly and the pot broach.

As fluid under pressure is admitted to the cylinder, the piston rod 14 moves upwardly and the upper pusher 40 causes an upwardly extending pilot portion 64 to center the workpiece on the pusher and to move it upwardly completely through the broach.

Figure 3:
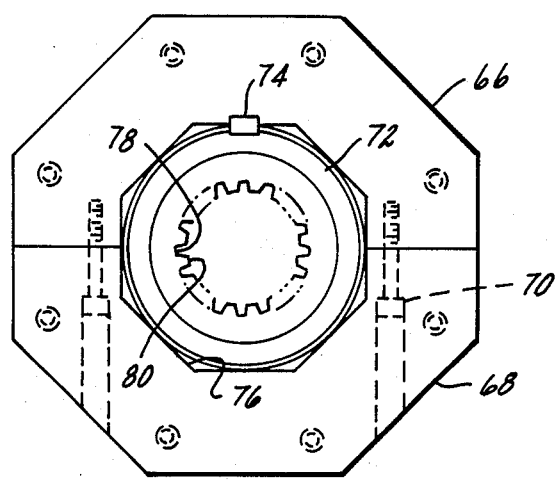
FIG. 3 is an end view of the pot broach.

The broach may be of the type disclosed in Psenka U.S. Pat. No. 3,332,129, also illustrated herein in FIG. 3. The broach comprises two elongated recessed housing members 66 and 68 assembled together by screws 70. Individually toothed rings 72 are stacked together, the teeth aligned by a key 74, and each ring having locating bearings with clamping surfaces 76. The root surfaces 78 between adjacent rows of cutting teeth 80 are segmental guide surfaces which are parallel to and concentric with the axis of the broach, and cooperate with the crests of pusher teeth 46 as previously described.

From the foregoing, it will be seen that as the workpiece is pushed through the broach contact between the broach teeth and the workpiece is limited to the sides and bottoms of the slots being cut on the workpiece and the sides and crests of the broach teeth. The crests of the teeth on the workpiece remain in clearance with respect to the broach.

The root surface portions of the broach between the longitudinally extending rows of stepped teeth are all parallel to the broach axis, and constitute guide surface cooperating with the crests of the teeth on the pusher to maintain the pusher and hence the workpiece concentric with the broach.

As seen in FIG. 1, a guide depends from the bottom end of the broach dimensioned to have minimum clearnace with respect to the workpiece, but to guide the movable work support or pusher 38,40 by engaging the crests of teeth 46. Thus, the workpiece is centered by engagement between the crests of guide teeth 46 with the tubular guide depending from the bottom of the broach and with the guide surfaces within the broach constituted by the roots between the cutting teeth. Circumferential guiding is provided by one or more guide keys 56, and associating slots 58 in the guide ring and extensions thereof in the pot broach.

It will be noted that the machine is designed for cutting slots in the peripheral wall of a thin walled workpiece of cup shape, which as machined, is inverted to have a generally horizontal top wall in which the opening 42 is provided. The upper pusher 40 includes generally horizontal upwardly facing surface 40a and a cylindrical surface 40b which engages and supports the side wall of the workpiece in the annular zone in which slots are to be cut. It will further be noted that the pusher 38, 40 constitutes the sole support for the workpiece as it is pushed through the broach. The forces between the broach teeth and the workpiece hold it firmly to the pusher as it moves through the broach. With the parts in the position illustrated in FIG. 1, it will be noted that the workpiece blank W is supported above the ring 32 by having its bottom edge engage by the upper ends of guide teeth 55. When the work support assembly moves upwardly, its cylindrical surface 40b moves into the workpiece, and the upper ends of guide and support teeth 46 of the lower pusher portion 38 of the work support pass through the tooth spaces of ring 32 and engage the lower edge of the workpiece shell. Thus, at this time the workpiece is located by cylindrical surface 40b, and supported axially only by spaced areas engaged by the tops of teeth 46 which are in alignment with tooth spaces in the broach. As the work support moves vertically, teeth 46 remain in engagement with teeth 55 of ring 32 until the workpiece enters broach 10, and thereafter move through the broach with the crests of teeth 46 in contact with the guide surfaces at the roots of the broach teeth.

I claim:

1. A pot broaching machine for cutting peripheral tooth-forming slots in the outer surface of the side wall of a cup-shaped thin-walled workpiece having a peripheral shell having a thin side wall provided with an inner and an outer cylindrical surfaces, which comprises a stationary frame,
   a vertically elongated pot broach on said frame having a multiplicity of circumferentially spaced parallel rows of longitudinally stepped cutting teeth adapted to cut slots in the outer cylindrical surface of the side wall of the workpiece, the root surfaces between at least some of the circumferentially adjacent rows of cutting teeth being guide surfaces parallel to the axis of said broach,
   an internally toothed guide ring on said frame spaced axially below said broach and having guide teeth in axial alignment with the cutting teeth in said broach,
   a work support of generally circular cross-section comprising a support portion having an external cylindrical surface engageable with the inner surface of the thin cylindrical side wall of the workpiece shell to center and support the workpiece on said work support,
   said work support also comprising a guide portion of generally circular cross-section having at its periphery a multiplicity of radially outwardly extending guide and support teeth in alignment with the spaces between adjacent rows of broach teeth and with the spaces between adjacent guide teeth in said guide ring, each guide and support tooth having a circumferential width slightly less than the circumferential spacing between adjacent rows of broach teeth and having a guide surface at its crest located at a radial distance from the axis of said work support to engage a corresponding one of the elongated guide surfaces of said broach,
   and means for moving the work support vertically to cause the upper ends of its guide and support teeth to pass through the tooth spaces of said locating ring into engagement with the end surface of the cylindrical shell of a workpiece located initially on the guide teeth of said locating ring and to push the workpiece through said broach.

2. A pot broaching machine as defined in claim 1, in which said lower pusher portion of said work support comprises at least one radially extending guide key received in a vertically extending slot in said frame to maintain alignment between said guide and support teeth of said lower pusher portion and the spaces between the guide teeth on said locating ring until said guide and support teeth enter said broach.

3. The method of pot broaching slots to form teeth on the periphery of the side wall of a thin-walled cup-shaped workpiece which comprises supporting the workpiece by engagement between the ends of elongated guide teeth on a movable pusher and engagement between an external cylindrical surface on the pusher and the internal cylindrical surface of the side wall of the workpiece, and guiding the pusher and workpiece through the pot broach by engagement between the crests of the guide teeth on the pusher and the root surfaces between circumferentially adjacent rows of broach teeth.

* * * * *